United States Patent
Hagerott

(10) Patent No.: US 10,969,796 B2
(45) Date of Patent: Apr. 6, 2021

(54) AUTOPILOT NONLINEAR COMPENSATION

(71) Applicant: Textron Aviation Inc., Wichita, KS (US)

(72) Inventor: Steven G. Hagerott, Wichita, KS (US)

(73) Assignee: Textron Innovation, Inc., Providence, RI (US)

( * ) Notice: Subject to any disclaimer, the term of this patent is extended or adjusted under 35 U.S.C. 154(b) by 256 days.

(21) Appl. No.: 16/196,485

(22) Filed: Nov. 20, 2018

(65) Prior Publication Data

US 2019/0196509 A1    Jun. 27, 2019

Related U.S. Application Data

(60) Provisional application No. 62/609,500, filed on Dec. 22, 2017.

(51) Int. Cl.
*G05F 1/08*    (2006.01)
*G05D 1/08*    (2006.01)

(52) U.S. Cl.
CPC ........... *G05D 1/0825* (2013.01); *G05D 1/085* (2013.01)

(58) Field of Classification Search
CPC ............................ G05D 1/0825; G05D 1/085
USPC .............................................................. 701/3
See application file for complete search history.

*Primary Examiner* — Maceeh Anwari
(74) *Attorney, Agent, or Firm* — Erise IP, P.A.

(57) ABSTRACT

An autopilot nonlinear compensation method includes providing an autopilot command for executing an aircraft maneuver, determining a desired aerodynamic moment of the aircraft based on the autopilot command, providing a measured pilot interface position, determining a total aerodynamic moment of the aircraft based on the measured pilot interface position and the autopilot command in combination with the desired aerodynamic moment, determining a ratio of the desired aerodynamic moment to the total aerodynamic moment, and adjusting the autopilot command with a corrective command based on the ratio. The method may be used to stabilize autopilot control of an aircraft following nonlinear deployment of a control surface.

20 Claims, 4 Drawing Sheets

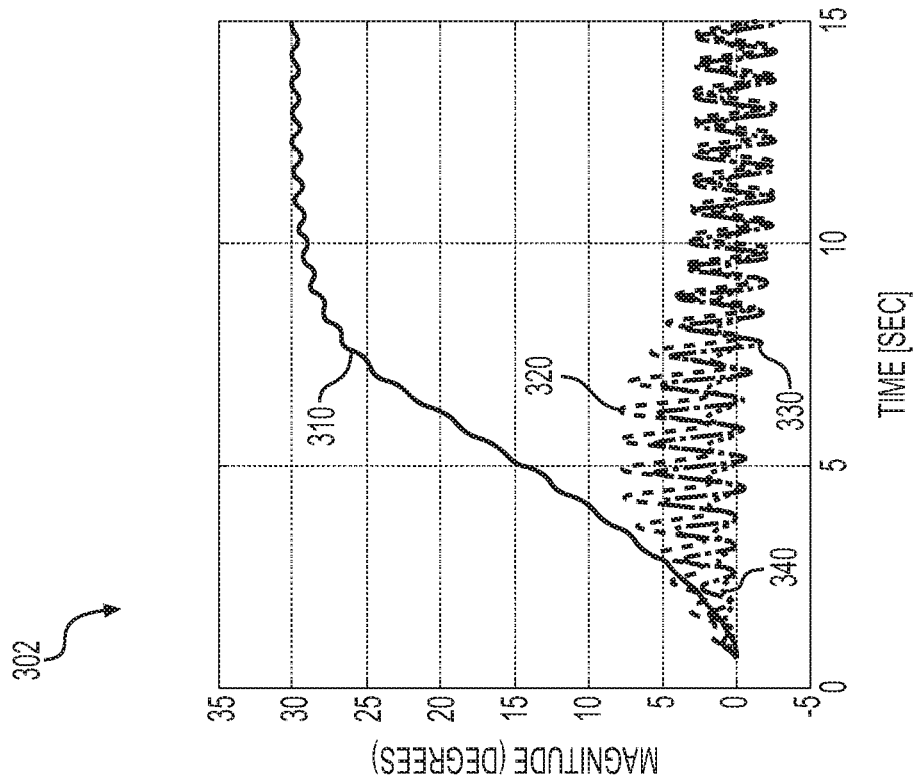
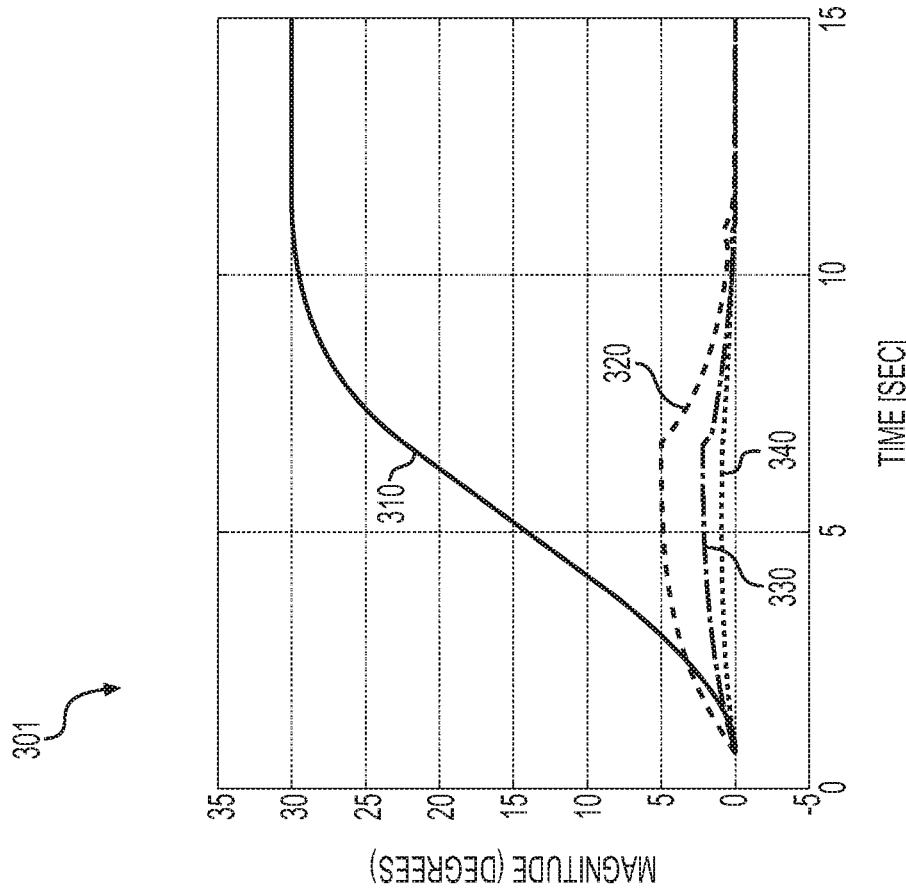
FIG. 3A
FIG. 3B

AUTOPILOT NONLINEAR COMPENSATION

CROSS-REFERENCE TO RELATED APPLICATIONS

This application claims the benefit of U.S. Provisional Patent Application Ser. No. 62/609,500 entitled Autopilot Nonlinear Compensation and filed Dec. 22, 2017, the disclosure of which is herein incorporated by reference in its entirety.

BACKGROUND

1. Field of the Disclosure

Embodiments of this disclosure relate generally to control of aircraft, and more specifically to autopilot control.

2. Description of the Related Art

None.

SUMMARY

In an embodiment, an autopilot nonlinear compensation method is provided for stabilizing autopilot control of an aircraft. The method includes providing an autopilot command for executing an aircraft maneuver; determining a desired aerodynamic moment of the aircraft based on the autopilot command; providing a measured pilot interface position; determining a total aerodynamic moment of the aircraft based on the measured pilot interface position and the autopilot command in combination with the desired aerodynamic moment; determining a ratio of the desired aerodynamic moment to the total aerodynamic moment; and, adjusting the autopilot command with a corrective command based on the ratio, thereby stabilizing the aircraft.

In another embodiment, an autopilot nonlinear compensation system is provided for stabilizing autopilot control of an aircraft. The system includes an autopilot controller adapted to transmit an autopilot command to a servo for positioning a control surface of the aircraft; a sensor adapted to provide a measured position of a pilot interface; and, a primary flight controller adapted to receive the autopilot command and to receive the measured position of the pilot interface for determining a ratio of a desired aerodynamic moment to a total aerodynamic moment based on the autopilot command and the measured position, the primary flight controller further adapted to adjust the autopilot command with a corrective command based on the ratio, thereby stabilizing the aircraft.

In yet another embodiment, an autopilot nonlinear compensation method is provided. The method includes providing a measured control-wheel position; providing an autopilot command for executing a roll of an aircraft; determining a perfected control-wheel position based on the measured control-wheel position and the autopilot command; determining a predicted spoiler position based on the perfected control-wheel position; determining a spoiler rolling moment based on the predicted spoiler position; determining a predicted aileron position based on the autopilot command; determining a desired rolling moment based on the predicted aileron position; determining a total rolling moment based on the spoiler rolling moment and the desired rolling moment; determining a ratio of the desired rolling moment to the total rolling moment; and, adjusting the autopilot command based on the ratio, thereby compensating for any additional unwanted rolling moment over the desired rolling moment.

BRIEF DESCRIPTION OF THE DRAWINGS

Illustrative embodiments of the present disclosure are described in detail below with reference to the attached drawing figures, which are incorporated by reference herein and wherein:

FIG. 3A is a plot showing a thirty-degree roll autopilot step response over time using the method of FIG. 2 for autopilot nonlinear compensation, in an embodiment;

FIG. 3B is a plot showing a thirty-degree roll autopilot step response over time without using the method of FIG. 2, in an embodiment;

DETAILED DESCRIPTION

Nonlinearities in an aircraft flight control system may cause instabilities to aircraft autopilot control. For example, mechanical nonlinearities may arise through linkages between a control wheel and a control surface. In another example, an undesired rolling moment during autopilot may be caused by a nonlinear deployment of roll spoilers. Prior methods to compensate for nonlinear instabilities include providing a feedback of the current roll spoiler position; however, this method requires a relatively large time delay that may fail to provide a sufficiently stable system. Other prior methods require linearity of a spoiler design, which may include disabling the roll spoilers or reshaping them. However, this approach negates the benefits of an existing roll spoiler system that has already been designed and certified for manually piloted operations.

Embodiments of the present disclosure provide compensation for nonlinearities in order to provide stability to the autopilot control. The nonlinearities may result from nonlinear spoiler deployment, but other sources of nonlinearities may be compensated for, without departing from the scope hereof. For example, autopilot non-linear compensation may be used in any aircraft control situation where nonlinearities contribute to an additional rolling moment, including but not limited to, a nonlinear rolling moment due to thrusters, or a nonlinear rolling moment of a quadcopter. In certain embodiments, a control wheel position is determined and used to predict rolling moments imparted on an aircraft and to determine corrective signals for stabilizing the autopilot signal. Without the corrective signals, an extra rolling moment (e.g., from nonlinear spoiler deployment) causes the system to oscillate.

Figure 1:
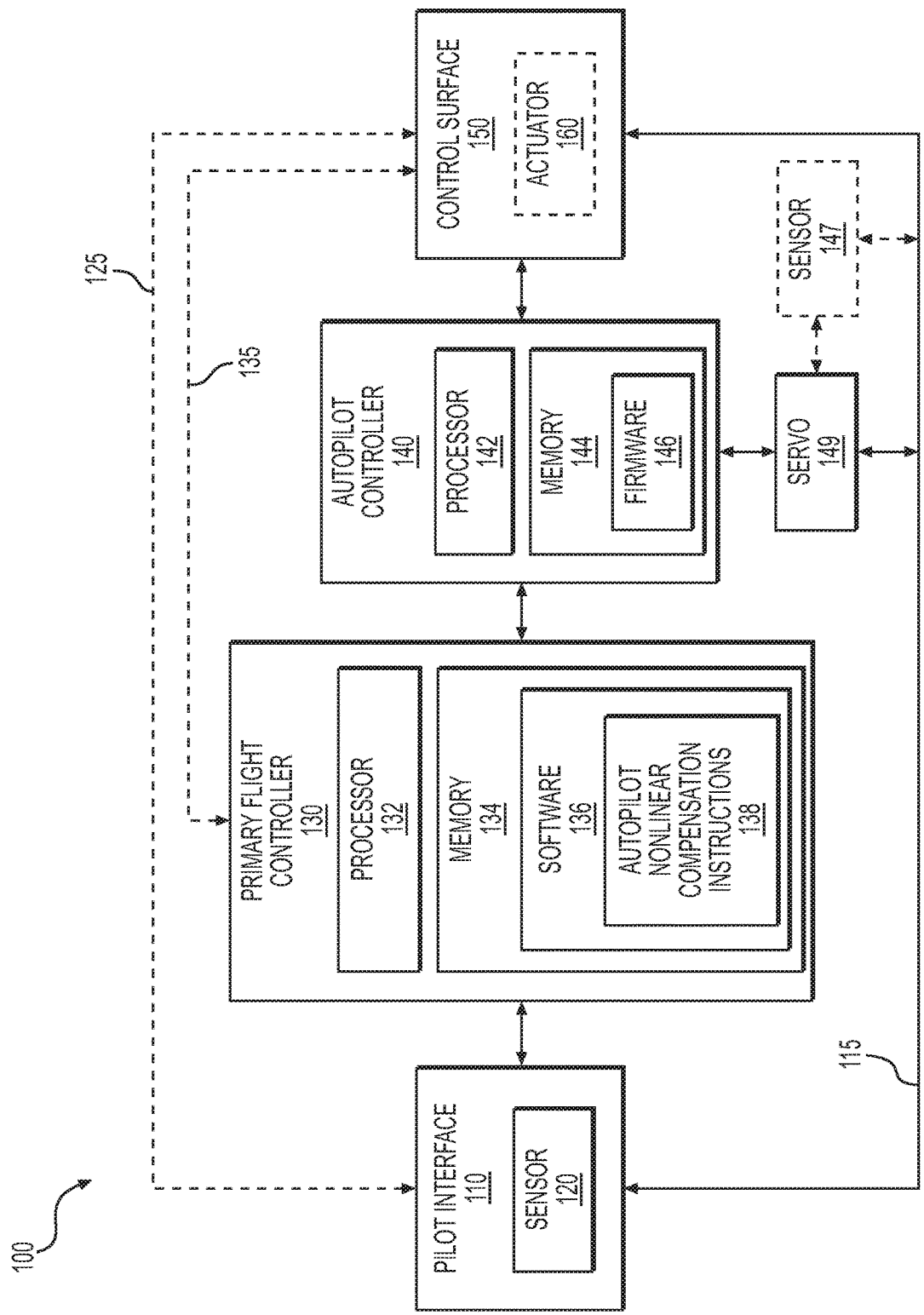
FIG. 1 is a block diagram showing a system for autopilot nonlinear compensation, in an embodiment.

FIG. 1 is a block diagram showing an exemplary system 100 for autopilot nonlinear compensation. System 100 may be implemented on any aircraft having a control surface controllable via a pilot interface and an autopilot controller for providing automatic control of the control surface. In the embodiment depicted in FIG. 1, a pilot interface 110 receives control inputs from a pilot for transmitting the control inputs to a control surface 150. The control inputs may be transmitted directly to control surface 150 via a mechanical linkage 115, or control signals may be transmitted to an actuator of control surface 150 via a signaling path 125 (e.g., in a fly-by-wire arrangement), or some combination of these may be employed.

An autopilot controller 140 receives input commands from a flight controller 130 and transmits commands to a servo 149 adapted to drive control surface 150 based on the input commands. Control surface 150 is for example one or more of an aileron, elevator, horizontal stabilizer, flap, slat, spoiler, or rudder. In practice, system 100 is used to control a plurality of control surfaces onboard an aircraft via at least one autopilot servo (e.g., a roll autopilot servo and a pitch autopilot servo). Only one control surface 150 and one servo 149 are depicted in FIG. 1 for clarity of illustration.

Pilot interface 110 is for example a control wheel, center stick, yoke, or other interface located onboard the aircraft or remotely (e.g., by a pilot of an unmanned aerial vehicle (UAV)). In certain embodiments, pilot interface 110 includes a first interface for a pilot and a second interface for a copilot (not shown), with the first and second interfaces configured to move in concert via one or more mechanical linkages (e.g., a roll mechanical linkage and a pitch mechanical linkage). In some embodiments, mechanical linkage 115 includes a known mechanical gearing that mechanically couples pilot interface 110 with servo 149. During autopilot operation, pilot interface 110 may move according to command inputs implemented by autopilot controller 140 via mechanical linkage 115.

A sensor 120 is mechanically coupled to pilot interface 110 for measuring a position of pilot interface 110. For example, sensor 120 may be one or more rotary variable differential transformers (RVDTs) used to measure rotations of pilot interface 110 (e.g., a control wheel rotation and/or a control stick pivot angle). In certain embodiments, sensor 120 includes a plurality of RVDTs configured as a set for determining an angle in a three-axis (e.g., X, Y, Z) space for commanding aircraft motions.

Flight controller 130 has a memory 134, including a non-transitory medium for storing software 136, and a processor 132 for executing instructions of software 136. Memory 134 in some embodiments is a memory system that includes both transitory memory such as RAM and non-transitory memory such as, ROM, EEPROM, Flash-EEPROM, magnetic media including disk drives, and optical media. Memory 134 stores software 136 as machine readable instructions executable by processor 132. Exemplary instructions of software 136 include autopilot nonlinear compensation instructions 138. In certain embodiments, flight controller 130 includes one or more flight computers (e.g., a primary flight computer and a backup flight computer). Flight controller 130 is configured to communicate with pilot interface 110, sensor 120, autopilot controller 140, control surface 150, and actuator 160 by one of a wired and/or wireless communication medium.

Autopilot controller 140 has a memory 144, including a non-transitory medium for storing software 146, and a processor 142 for executing instructions of software 146. Memory 144 is an example of memory 134 that stores software 146 as machine readable instructions executable by processor 142. In certain embodiments, autopilot controller 140 includes one or more of a microprocessor, microcontroller, programmable logic controller, and printed circuit boards. Autopilot controller 140 is adapted to communicate with servo 149 and flight controller 130 by one of a wired and/or wireless communication medium. In certain embodiments, autopilot controller 140 and servo 149 are implemented as an integrated autopilot servo device, such as a roll autopilot servo for driving control surface 150 (e.g., a roll spoiler and/or an aileron) for providing roll function. Autopilot controller 140 determines command signals for commanding servo 149 based on a bank angle and/or a roll rate (e.g., from sensor 120 or primary flight controller 130), and in some embodiments, based on air data from controller 130.

Autopilot nonlinear compensation instructions 138 are used to compute an undesired rolling moment generated from the aircraft as a result of a nonlinearity. In certain embodiments, instructions 138 execute steps of a method, such as method 200 described below in connection with FIGS. 2 and 5. Instructions 138 include an algorithm that calculates a position of pilot interface 110 (e.g., a control-wheel) based on measurements from sensor 120 in combination with autopilot commands. The position is used to determine rolling moments imparted on the aircraft (see e.g., steps 248 and 255, FIG. 2). Based on the rolling moments, flight controller 130 generates corrective command signals for correcting roll-spoiler command signals (see e.g., step 270, FIG. 2). The corrective signals have low latencies that compensate for nonlinearities quickly enough to stabilize a signal from autopilot controller (see e.g., step 280, FIG. 2). Without the corrective signals, an extra rolling moment (e.g., caused by nonlinear roll spoiler deployment) may cause the system to oscillate as described below in connection with FIGS. 3B, 4B, and 4D.

In certain embodiments, autopilot controller 140 lacks information about an absolute position of servo 149. As such, a sensor 147 may optionally be coupled with servo 149 for determining a position of servo 149. For example, sensor 147 may be a set of hall-effect sensors positioned around an electrical motor shaft of servo 149 for determining an angular rotation position of the electrical motor shaft. Alternatively, sensor 147 may be coupled to mechanical linkage 115 for determining a position of servo 149. In some embodiments, servo 149 drives both a roll spoiler and an aileron in a coordinated manner for providing roll functionality, and sensor 147 may be used to determine a position of both the roll spoiler and the aileron.

In operation, system 100, FIG. 1 is used to provide an autopilot nonlinear compensation method for stabilizing autopilot control of control surfaces. Autopilot controller 140 provides an autopilot command to primary flight controller 130 for executing an aircraft maneuver. Using autopilot nonlinear compensation instructions 138, primary flight controller 130 determines a desired aerodynamic moment of the aircraft based on the autopilot command. Meanwhile, primary flight controller 130 receives a measured position of pilot interface 110 via sensor 120. Based on the measured position of pilot interface 110 in combination with the autopilot command, primary flight controller 130 determines a total aerodynamic moment of control surface 150. When the total aerodynamic moment differs from the desired aerodynamic moment (e.g., due to nonlinearities induced during deployment of the control surface), primary flight controller 130 calculates a ratio of the desired to the total aerodynamic moment and uses the ratio to adjust the autopilot command to servo 149. By adjusting the autopilot command with a corrective command based on the ratio, control of the aircraft is stabilized and unwanted oscillations are damped. Method 200, described below, is an embodiment of the autopilot nonlinear compensation method for stabilizing autopilot roll control of an aircraft.

Figure 2:
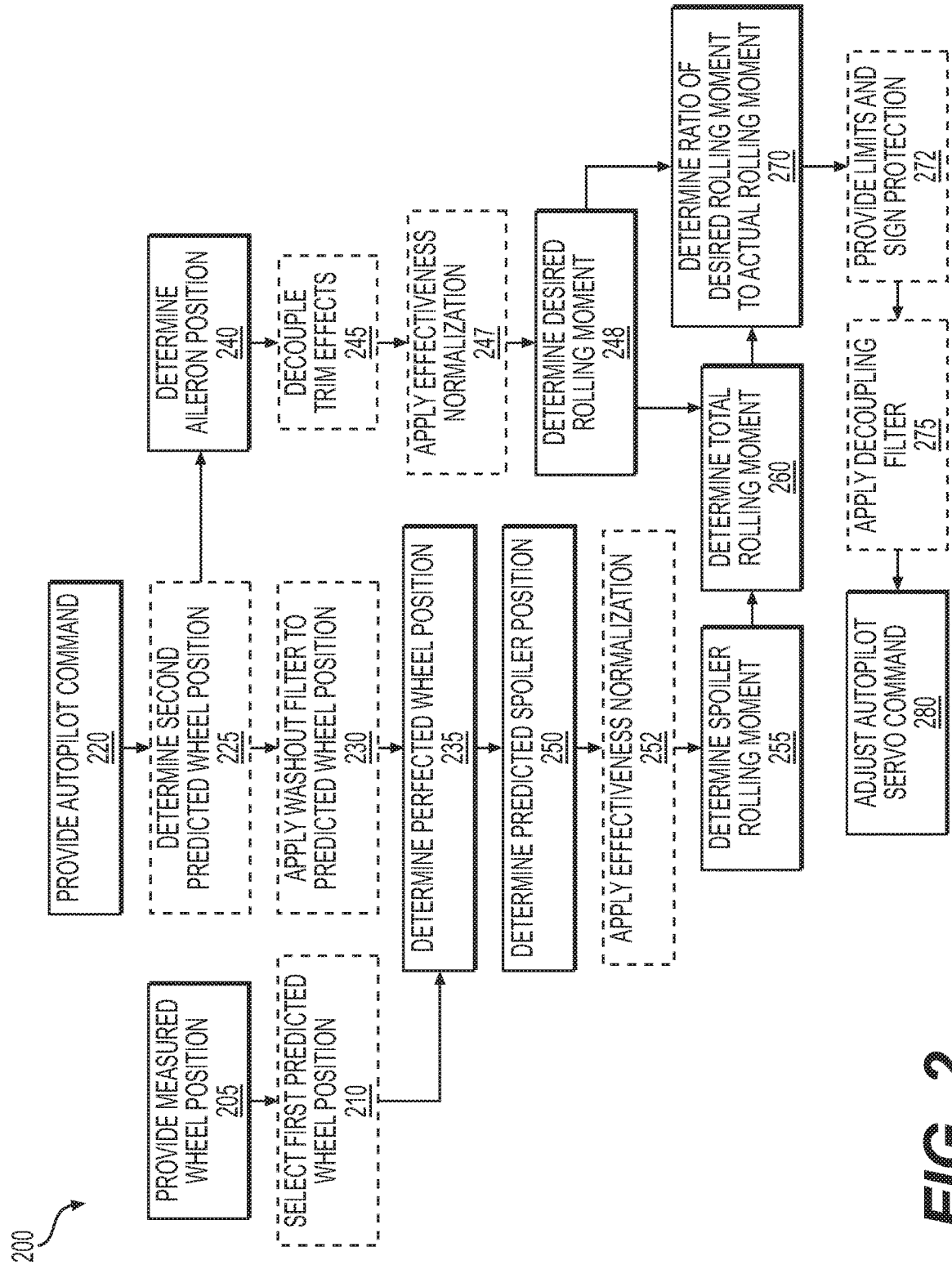
FIG. 2 is a block diagram showing a method for autopilot nonlinear compensation, in an embodiment.

FIG. 2 is a block diagram showing an exemplary method 200 for autopilot nonlinear compensation. Method 200 may be performed by system 100, FIG. 1 via autopilot nonlinear compensation instructions 138, for example. For the embodiment depicted in FIG. 2, pilot interface 110 is a control wheel and many of the steps of method 200 are directed to a position of the control wheel; however, method 200 may be used with other types of pilot interfaces (e.g., yoke, sidestick, etc.) without departing from the scope hereof. Method 200 may be used to compensate for an extra rolling moment due to a nonlinear effect, such as spoiler motion outside of a deadband.

In a step 205, a measured control-wheel position is provided. In an example of step 205, sensor 120, FIG. 1 provides input signal to flight controller 130 of a measured control-wheel position. In certain embodiments, the measured control-wheel position signal has a low update rate.

In an optional step 210, a first predicted control-wheel position is selected. In an example of step 210, flight controller 130 selects the first predicted control-wheel position using a complementary signal filter on the measured control-wheel position signal based on autopilot nonlinear compensation instructions 138. The complementary filter compensates for latency in the measured control-wheel position signal. In certain embodiments, the complementary signal filter is a low frequency branch of a complementary filter, with a high frequency branch of the complementary filter being provided in step 230.

In a step 220, an autopilot command is provided. In an example of step 220, autopilot controller 140 provides an autopilot command to servo 149 and to flight controller 130.

In an optional step 225, a second predicted control-wheel position is determined. In an example of step 225, flight controller 130 determines the second predicted control-wheel position based on position information of servo 149 from sensor 147. In certain embodiments, the second predicted control-wheel position is modified based on a gearing ratio to account for gearing differences between a capstan (e.g., a gear-box output) and a tie-in with the mechanical linkage 115.

In an optional step 230, a washout filter is applied to the second predicted control-wheel position signal. In an example of step 230, flight controller 130 applies the washout filter to the second predicted control-wheel position signal to correct bias errors (e.g., errors due to offsets between a nominal position of the servo and control-wheel). In certain embodiments, the washout filter in step 230 is the high frequency branch of the complementary filter in step 210.

In a step 235, flight controller 130 combines the first predicted control-wheel position with the second predicted control-wheel position to determine a "perfected" control-wheel position. The resulting perfected control-wheel position signal includes a low frequency position signal derived from the first predicted control-wheel position (e.g., measured from the control-wheel), and a high frequency position signal from the second predicted control-wheel position (e.g., derived from autopilot servo motion). The perfected control-wheel position signal does not have time delays associated with the measured control-wheel position since control-wheel motion is downstream of the response from autopilot servo 149 and is updated at a low rate. In certain high frequency situations, the perfected control-wheel position is based solely on the autopilot command to avoid time delays associated with the measured control-wheel position.

In a step 240, an aileron position is determined. based on the autopilot commanded position. In an example of step 240, flight controller 130 determines a predicted aileron position based on the second predicted control-wheel position of step 225. In an alternative example of step 240, flight controller 130 determines a predicted aileron position based on the perfected control-wheel position of step 235. In certain embodiments, the aileron position is measured by measuring a position of servo 149 via sensor 147. Alternatively, an additional sensor (not shown) measures aileron position directly. For example, with mechanical linkage arrangements, an independent measurement of aileron position may be needed to account for cable stretch, which varies with airspeed.

In an optional step 245, trim effects are decoupled. In an example of step 245, flight controller 130 applies a washout filter to the aileron position signal to decouple trim effects. In some embodiments, filtering of the aileron position signal is omitted, and no washout filter is used for the aileron position.

In an optional step 247, primary controller 130 applies an effectiveness normalization to the aileron position signal to account for variations in aileron position. For example, at high speed, the aileron does not move as far for a given input command due to aerodynamic loading on the aileron (e.g., aileron knockdown). The effectiveness normalization may be empirically derived or scheduled based on a model and is stored in memory 134 of flight controller 130, for example.

In a step 248, a desired aerodynamic rolling moment is determined. In an example of step 248, primary controller 130 determines a desired aerodynamic rolling moment based on the predicted spoiler position. The desired rolling moment is the expected linear rolling moment based on the autopilot roll command. In other words, the desired rolling moment is the rolling moment without any nonlinearity-induced additional rolling moment.

In a step 250, flight controller 130 determines a predicted spoiler position based on the perfected control-wheel position. In an example of step 250, controller 130 determines a predicted position of a spoiler (e.g., control surface 150) based on the perfected wheel position while accounting for wheel-to-spoiler gearing and a flaps position. Spoiler position may be nonlinear as a result of mechanical or fly-by-wire controlled actuator systems.

In an optional step 252, primary controller 130 applies an effectiveness normalization to the spoiler position signal to account for variations in spoiler position. The effectiveness normalization may be empirically derived or scheduled based on a model and is stored in memory 134 of flight controller 130, for example.

In a step 255, a spoiler rolling moment is determined. In an example of step 255, controller 130 determines the spoiler rolling moment based on the predicted spoiler position and known aircraft information. In some embodiments, controller 130 determines the spoiler rolling moment further based on air data (e.g., received from pitot tubes).

In a step 260, a total rolling moment is determined based on the desired rolling moment and the spoiler rolling moment. In an example of step 260, controller 130 calculates a sum of the desired rolling moment signal and the spoiler rolling moment signal to determine the total rolling moment. The total (aerodynamic) rolling moment may include any nonlinearities such as mechanical nonlinearities (e.g., due to the linkages between the control wheel and the control surface). In other words, the total rolling moment is based on what the aircraft experiences in the presence of a nonlinearity-induced rolling moment (e.g., due to spoiler deployment) that is in addition to a desired rolling moment based on an input command.

In a step 270, a desired rolling moment is compared to a total rolling moment. In an example of step 270, controller 130 calculates a ratio of the desired rolling moment to the total rolling moment.

In an optional step 272, spoiler knockdown limits and sign protection are provided by controller 130. For example, under operating conditions with the control wheel near a null roll position, the total rolling moment is close to zero, which creates a numerical complication (i.e., the ratio approaches infinity as the total rolling moment approaches zero). To avoid the numerical complication, controller 130 provides a lower limit on the absolute value of the total rolling moment when determining the ratio. Sign protection is provided to avoid mixing positive and negative values (e.g., when close to zero) because it does not make physical sense for the aileron and spoiler to be positioned in opposite directions. This avoids applying a negative knockdown factor to a positive control signal, for example. Autopilot nonlinear compensation instructions 138 provides a series of logical operators to handle these special circumstances.

In an optional step 275, a decoupling filter is used to modulate how rapidly a gain factor is changed, to decouple a computational algebraic loop, and to avoid excitation of higher frequency dynamics, such as structural- or mechanical-system modes.

In a step 280, the autopilot servo command is adjusted based on the ratio of the desired rolling moment to the total rolling moment. In an example of step 280, the ratio is used to factor the autopilot command. In other words, the autopilot servo position may be reduced by a factor proportional to the ratio (e.g., multiplied by the ratio). In this manner, the autopilot command is adjusted by an amount proportional to the amount that the desired rolling moment differs from the total rolling moment.

FIG. 3A includes a plot 301 showing a thirty-degree roll autopilot step response over time using method 200 for autopilot nonlinear compensation. FIG. 3B includes a plot 302 showing a thirty-degree roll autopilot step response over time without using method 200 for autopilot nonlinear compensation. Plots 301, 302 are based on a simulation of a thirty-degree roll autopilot step command with a spoiler dead band. Other simulation parameters include a calibrated airspeed of 410 knots, an altitude of 25,000-feet, a light-weight aircraft configuration, an aft center-of-gravity, a 6-dB margin check, and a roll structural mode filter. A line 310 illustrates a total roll angle of the aircraft in degrees. A line 320 shows a roll rate in degrees per second. A line 330 shows an outboard spoiler actuator position in degrees. A line 340 illustrates an aileron actuator position in degrees. Note that, without using method 200, lines 310, 320, 330, and 340 oscillate in FIG. 3B. In contrast, while using method 200 to compensate for autopilot spoiler nonlinearities, lines 310, 320, 330, and 340 are smoothed in FIG. 3A.

Figure 4B:
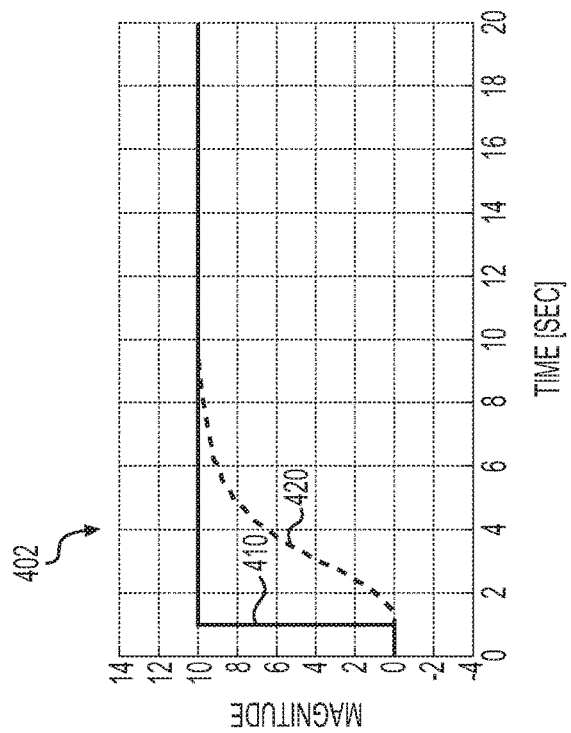
FIG. 4B is a plot showing an aircraft bank-angle response over time following an autopilot ten-degree roll step command without using the method of FIG. 2, in an embodiment.
Figure 4D:
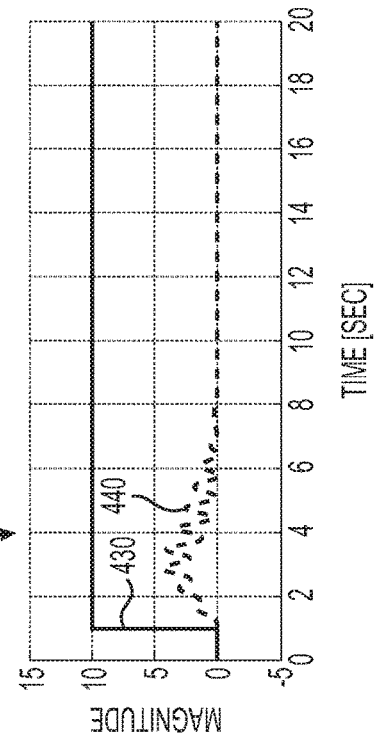
FIG. 4D is a plot showing an aircraft roll-rate response over time following an autopilot ten-degree roll step command without using the method of FIG. 2, in an embodiment.
Figure 4A:
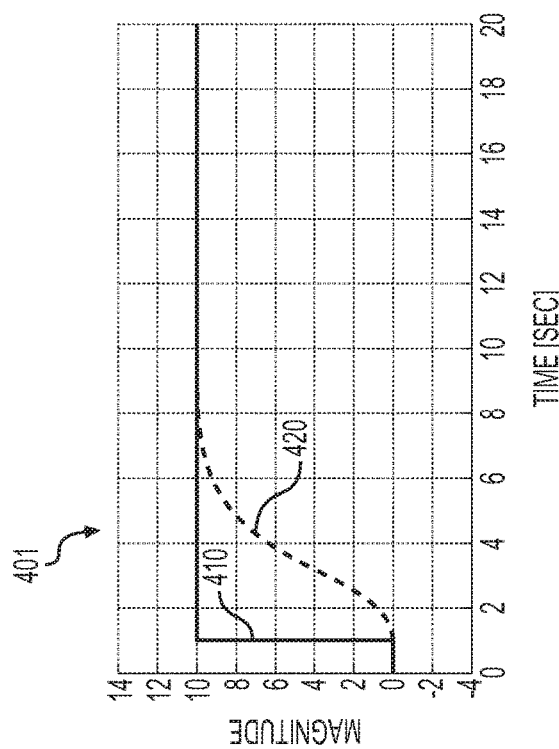
FIG. 4A is a plot showing an aircraft bank-angle response over time following an autopilot ten-degree roll step command while using the method of FIG. 2 for autopilot nonlinear compensation, in an embodiment.
Figure 4C:
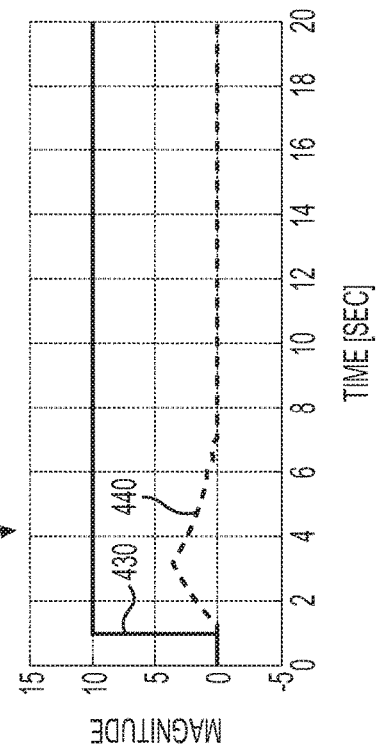
FIG. 4C is a plot showing an aircraft roll-rate response over time following an autopilot ten-degree roll step command while using the method of FIG. 2 for autopilot nonlinear compensation, in an embodiment.

FIG. 4A includes a plot 401 showing an aircraft bank-angle response over time following an autopilot ten-degree roll step command while using method 200 for autopilot nonlinear compensation. FIG. 4B includes a plot 402 showing an aircraft bank-angle response over time following an autopilot ten-degree roll step command without using method 200 for autopilot nonlinear compensation. FIG. 4C includes a plot 403 showing an aircraft roll-rate response over time following an autopilot ten-degree roll step command while using method 200 for autopilot nonlinear compensation. FIG. 4D includes a plot 404 showing an aircraft roll-rate response over time following an autopilot ten-degree roll step command without using method 200 for autopilot nonlinear compensation. Plots 401, 402, 403, and 404, are based on a simulation of a ten-degree roll autopilot step input command. Other simulation parameters include a calibrated airspeed of 410 knots, an altitude of 25,000-feet, a light-weight aircraft configuration, an aft center-of-gravity, a 6-dB margin check, and a roll structural mode filter.

In FIGS. 4A and 4B, a line 410 illustrates the autopilot input command and a line 420 shows the response (i.e., the aircraft bank angle) in degrees versus time in seconds. Note that, without using method 200, the response (line 420) oscillates in FIG. 4B. In contrast, while using method 200 to compensate for autopilot spoiler nonlinearities, the response (line 420) is smoothed in FIG. 4A.

In FIGS. 4C and 4D, a line 430 illustrates the autopilot input command and a line 440 shows the response (i.e., the aircraft roll rate) in degrees per second versus time in seconds. Note that, without using method 200, the response (line 440) oscillates in FIG. 4D. In contrast, while using method 200 to compensate for autopilot spoiler nonlinearities, the response (line 440) is smoothed in FIG. 4C.

In operation, method 200 may be employed with many types of flight control systems. In certain embodiments, a manually-controlled control surface 150 is mechanically coupled with pilot interface 110 and servo 149 via mechanical linkage such that pilot inputs are physically transmitted to control surface 150. In some embodiments, an actuator is employed that contributes some or all of the force for moving control surface 150 in combination with a mechanical linkage. The actuator may include an electro-hydraulic servo valve (EHSV) or an electromechanical valve (e.g., solenoid valve), for example. In other embodiments, a computer-controlled, fully-powered rudder control system (e.g., a fly-by-wire system) is employed which includes a control signal transmitted from pilot interface 110 or autopilot controller 140 to actuator 160 for actuating movement of control surface 150.

In certain embodiments, system 100 and method 200 may be used as an adaptive controller. For example, if any control surface onboard an aircraft fails, primary flight controller 130 may use method 200 to dynamically compute new commands to the remaining functioning control surfaces so that autopilot controller 140 maintains the autopilot control loop within a desired gain for maintaining stabilization of the aircraft.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An autopilot nonlinear compensation method for stabilizing autopilot control of an aircraft, comprising:
providing an autopilot command for executing an aircraft maneuver from an autopilot controller to a primary flight controller of an aircraft;
determining, via the primary flight controller, a desired aerodynamic moment of the aircraft based on the autopilot command;
receiving, via the primary flight controller, a signal from a sensor, the signal being indicative of a pilot interface position; and
determining, via the primary flight controller:
a measured pilot interface position based on the signal from the sensor;
a total aerodynamic moment of the aircraft based on the measured pilot interface position and the autopilot command in combination with the desired aerodynamic moment;
a ratio of the desired aerodynamic moment to the total aerodynamic moment; and
adjusting, via the primary flight controller, the autopilot command with a corrective command based on the ratio to compensate for a nonlinear deployment of a control surface, thereby stabilizing the aircraft.

2. The method of claim 1, further comprising damping unwanted oscillations of the control surface induced by nonlinear deployment of the control surface.

3. The method of claim 1, further comprising determining a perfected pilot interface position based on the autopilot command combined with the measured pilot interface position, the perfected pilot interface position having a lower latency compared to the measured pilot interface position.

4. The method of claim 3, wherein determining the total aerodynamic moment comprises determining a predicted position of the control surface based on the perfected pilot interface position.

5. The method of claim 4, wherein determining the total aerodynamic moment further comprises determining a predicted aerodynamic moment of the aircraft based on the predicted position of the control surface.

6. The method of claim 1, wherein upon failure of any control surface onboard the aircraft, determining new autopilot commands to any remaining functioning control surfaces thereby maintaining stabilization of the aircraft.

7. An autopilot nonlinear compensation system for stabilizing autopilot control of an aircraft, comprising:
an autopilot controller that transmits an autopilot command to a servo for positioning a control surface of the aircraft;
a position sensor that provides a measured position of a pilot interface; and
a primary flight controller that receives the autopilot command and that receives the measured position of the pilot interface,
wherein the primary flight controller determines a ratio of a desired aerodynamic moment to a total aerodynamic moment based on the autopilot command and the measured position, and
the primary flight controller adjusts the autopilot command with a corrective command based on the ratio to compensate for a nonlinear deployment of the control surface, thereby stabilizing the aircraft.

8. The system of claim 7, wherein the primary flight controller determines the desired aerodynamic moment of the aircraft based on the autopilot command.

9. The system of claim 7, wherein the primary flight controller determines the total aerodynamic moment of the aircraft based on the measured position and the autopilot command in combination with the desired aerodynamic moment.

10. The system of claim 7, wherein the corrective command removes undesired oscillations of the control surface.

11. The system of claim 7, wherein the corrective command compensates for a nonlinear deployment of the control surface.

12. The system of claim 7, wherein the corrective command stabilizes the autopilot control of the aircraft.

13. An autopilot nonlinear compensation method, comprising:
measuring a control-wheel position with a sensor;
providing an autopilot command for executing a roll of an aircraft from an autopilot controller to a primary flight controller of the aircraft;
determining, via the primary flight controller:
a perfected control-wheel position based on the measured control-wheel position and the autopilot command;
a predicted spoiler position based on the perfected control-wheel position;
a spoiler rolling moment based on the predicted spoiler position;
a predicted aileron position based on the autopilot command;
a desired rolling moment based on the predicted aileron position;
a total rolling moment based on the spoiler rolling moment and the desired rolling moment; and
a ratio of the desired rolling moment to the total rolling moment; and
adjusting, via the primary flight controller, the autopilot command with a corrective command based on the ratio, thereby compensating for any additional unwanted rolling moment over the desired rolling moment.

14. The method of claim 13, further comprising selecting a first predicted control-wheel position based on the measured control-wheel position prior to determining the perfected control-wheel position.

15. The method of claim 13, further comprising determining a second predicted control-wheel position based on the autopilot command prior to determining the perfected control-wheel position.

16. The method of claim 13, wherein determining the predicted aileron position is based on the perfected control-wheel position instead of the autopilot command.

17. The method of claim 13, further comprising decoupling trim effects from the predicted aileron position and applying an effectiveness normalization prior to determining the desired rolling moment.

18. The method of claim 13, further comprising providing a lower limit on the absolute value of the total rolling moment when determining the ratio.

19. The method of claim 13, further comprising providing sign protection for the ratio to avoid applying a negative knockdown factor to a positive control signal.

20. The method of claim 13, further comprising applying a decoupling filter to the ratio prior to adjusting the autopilot command.

* * * * *